United States Patent
Lenz et al.

(10) Patent No.: US 12,157,704 B2
(45) Date of Patent: Dec. 3, 2024

(54) BORON NITRIDE AEROGEL INTERFACE COATING PRECURSOR FOR CERAMIC MATRIX COMPOSITES

(71) Applicant: Raytheon Technologies Corporation, Farmington, CT (US)

(72) Inventors: Brendan Lenz, Wethersfield, CT (US); Evan B. Callaway, Santa Barbara, CA (US)

(73) Assignee: RTX Corporation, Farmington, CT (US)

( * ) Notice: Subject to any disclaimer, the term of this patent is extended or adjusted under 35 U.S.C. 154(b) by 105 days.

(21) Appl. No.: 18/084,932

(22) Filed: Dec. 20, 2022

(65) Prior Publication Data
US 2024/0199498 A1    Jun. 20, 2024

(51) Int. Cl.
| | |
|---|---|
| *C04B 35/628* | (2006.01) |
| *C04B 35/80* | (2006.01) |
| *C04B 41/00* | (2006.01) |
| *C04B 41/45* | (2006.01) |
| *C04B 41/48* | (2006.01) |
| *C04B 41/50* | (2006.01) |

(52) U.S. Cl.
CPC ........ *C04B 35/62868* (2013.01); *C04B 35/80* (2013.01); *C04B 41/0072* (2013.01); *C04B 41/4584* (2013.01); *C04B 41/4869* (2013.01); *C04B 41/5059* (2013.01); *C04B 2235/3826* (2013.01); *C04B 2235/386* (2013.01); *C04B 2235/614* (2013.01); *C04B 2235/616* (2013.01)

(58) Field of Classification Search
CPC .......................... C04B 35/62868; C04B 35/80
See application file for complete search history.

(56) References Cited

U.S. PATENT DOCUMENTS

| | | | |
|---|---|---|---|
| 9,815,736 B2 | 11/2017 | Dunn et al. | |
| 2012/0027572 A1* | 2/2012 | Denece | F01D 9/04 415/127 |
| 2012/0144714 A1 | 6/2012 | Cabahug et al. | |
| 2014/0287641 A1* | 9/2014 | Steiner, III | F41H 5/0471 428/317.1 |

FOREIGN PATENT DOCUMENTS

| | | |
|---|---|---|
| CN | 112479691 A | 3/2021 |
| CN | 114471739 A | 5/2022 |
| CN | 114804895 A | 7/2022 |
| KR | 102282019 B1 | 7/2021 |

OTHER PUBLICATIONS

Extended European Search Report for EP Application No. 23212892.6, dated May 24, 2024, 7 pages.

(Continued)

*Primary Examiner* — Robert A Vetere
(74) *Attorney, Agent, or Firm* — Kinney & Lange, P.A.

(57) ABSTRACT

A method of forming a ceramic matrix composite (CMC) comprises applying a boron nitride (BN) aerogel to a fibrous material to form a pretreated fibrous material, depositing, using chemical vapor infiltration (CVI), a BN interface coating (IFC) on the pretreated fibrous material, and depositing a matrix on the BN IFC and the pretreated fibrous material.

20 Claims, 5 Drawing Sheets

(56) References Cited

OTHER PUBLICATIONS

J. Chen, et al., "Cellulose Nanofiber Supported 3D Interconnected BN Nanosheets for Epoxy Nanocomposites with Ultrahigh Thermal Management Capability", from Advanced Functional Materials, (2017) 9 pages.

X. Wang, et al., "Boosting the thermal conductivity of CNF-based composites by cross-linked lignin nanoparticle and BN—OH: Dual construction of 3D thermally conductive pathways", from Composites Science and Technology 204, (2021) 9 pages.

* cited by examiner

BORON NITRIDE AEROGEL INTERFACE COATING PRECURSOR FOR CERAMIC MATRIX COMPOSITES

BACKGROUND

The present invention relates to ceramic matrix composites, and more particularly to the formation of corrosion-resistant coatings therein.

Fiber-reinforced ceramic matrix composites (CMCs) are known and used for components that are exposed to high temperatures and corrosive conditions that can degrade other kinds of materials. Under such severe conditions, such as the operating conditions in aerospace applications, even ceramic materials are vulnerable to degradation. Over time, ceramic composites can form microcracks that further expose the ceramic material to oxygen or other corrosive elements, which form undesirable phases to the detriment of the properties of the ceramic matrix composite component.

Fibers can be coated with a layer of boron nitride (BN) to form a weak interface between the fibers and matrix material to enable desired composite characteristics. The thickness of this interface coating (IFC) layer influences fiber sliding stresses and IFC oxidation resistance. As such, it is important to control and optimize IFC layer thickness uniformity throughout the CMC. However, it can be difficult to achieve uniform thickness through chemical vapor infiltration (CVI) because reactant gases have to diffuse through a highly tortuous fiber pore network, which can lead to uneven deposition of BN. Thus, a need exists for means of improving BN IFC deposition.

SUMMARY

A method of forming a ceramic matrix composite (CMC) comprises applying a boron nitride (BN) aerogel to a fibrous material to form a pretreated fibrous material, depositing, using chemical vapor infiltration (CVI), a BN interface coating (IFC) on the pretreated fibrous material, and depositing a matrix on the BN IFC and the pretreated fibrous material.

Figure 1:
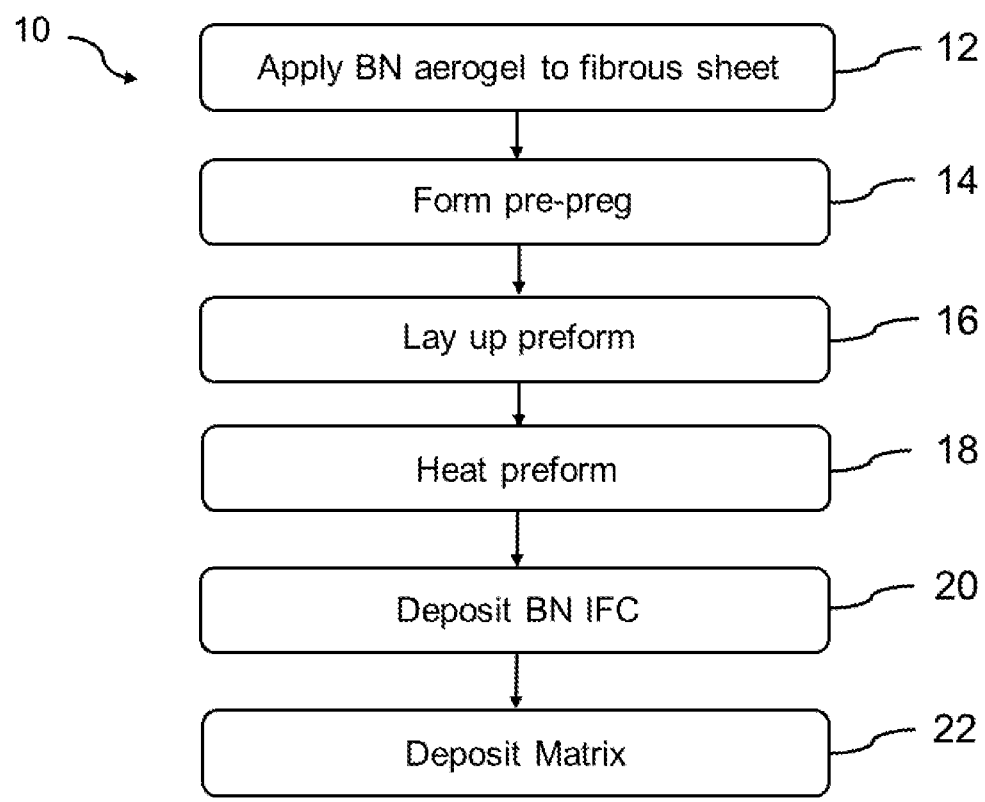
FIG. 1 is a flowchart illustrating a method of forming a CMC from pretreated fibrous sheets.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a method of pretreating a fibrous material with BN aerogel prior to applying a BN IFC layer via chemical vapor infiltration (CVI). The BN aerogel facilitates deposition of a more uniform BN IFC layer and can promote favorable formation of h-BN.

Figure 2:
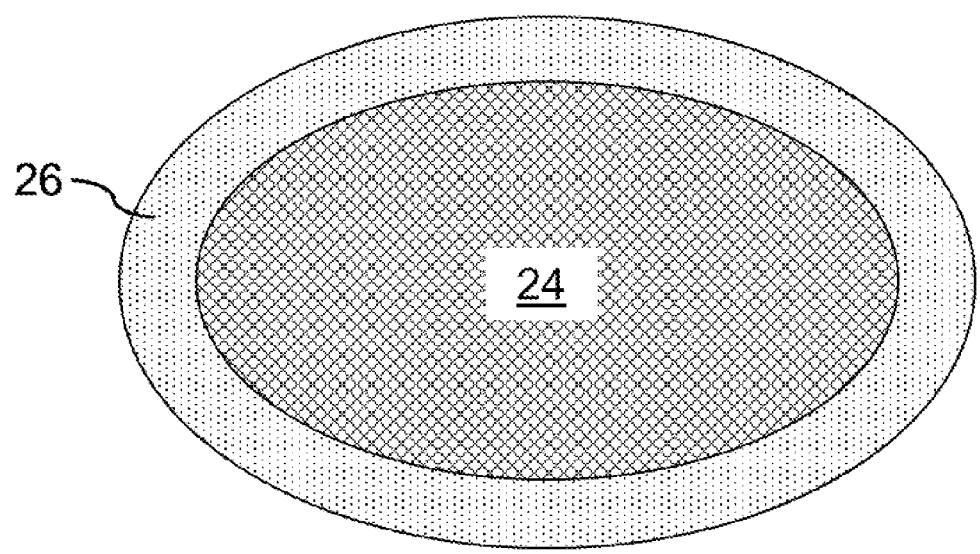
FIG. 2 is a simplified cross-sectional illustration of a fiber coated with BN aerogel.
Figure 3:
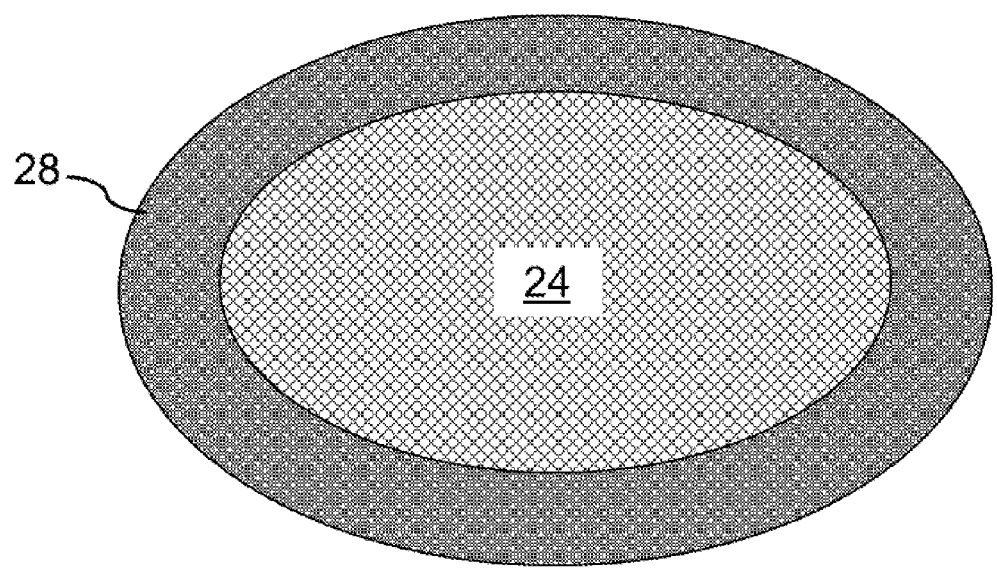
FIG. 3 is a simplified cross-sectional illustration of a fiber coated with a BN IFC.

FIG. 1 is a method flowchart illustrating select steps of method 10 for fabricating a CMC with a pretreated sheet formed from fibers 24. FIG. 2 is a simplified cross-sectional view of an individual fiber 24 after pretreatment. FIG. 3 is a simplified cross-sectional view of fiber 24 after application of BN IFC layer (28). Method 10 is discussed together with FIGS. 1-3.

At step 12, BN aerogel can be applied to a sheet of fibers 24. Fibers 24 can be formed from silicon carbide (SiC) or other suitable ceramic material. In some embodiments, multiple fibers 24 can be bundled to form individual tows. Fibers 24 can be incorporated into a cloth/sheet and arranged in one of various two or three-dimensional woven architectures such as plain, harness (e.g., 3, 5, 8, etc.), twill, braid, or non-symmetric to name a few non-limiting examples. Non-woven architectures (e.g., chopped, felted, etc.) are also contemplated herein. Plies can be formed from sheets and laid up into a fibrous preform structure.

Application of BN aerogel can be a two-step process in which a slurry of BN is applied to fibers 24 followed by freeze-drying of the applied BN. The slurry can be prepared by ball milling a hexagonal BN (h-BN) powder, adding the h-BN to a water bath, and dispersing the h-BN in the water bath using ultrasonication. In one example, a sheet of fibers 24 can be pulled through the water bath such that a slurry of h-BN coats the sheet forming a slurry-coated sheet. The sheet can be taken from a spool and pulled through the bath under tension created by a series of rollers. The slurry-coated sheet is subsequently freeze-dried to form BN aerogel layer 26 (FIG. 2). The BN aerogel includes a mixture of BN nanotubes and h-BN nanosheets, and has a high surface area and low density. After freeze-drying, the sheet can be considered a pretreated sheet with respect to the application of the BN aerogel.

Step 14 can be a pre-impregnation ("pre-pregging") step in which the pretreated sheet is injected with a polymeric resin and cured. Exemplary resins can include polyvinyl alcohol (PVA) with water or polyvinyl butyral (PVB) with alcohol. Backing films can optionally be applied to each side of the pre-preg sheet to protect it during subsequent storage and/or handling.

Step 16 is a preforming step in which the pre-preg sheet is cut into plies and laid up in a an end-to-end and/or layer-by-layer fashion to form a multidimensional preform. In many cases, the preform can be supported by one or more sets of rigid tooling, formed from materials such as plastic, steel, aluminum, and or graphite. The preform need not be exclusively formed from pretreated fabrics, and can include both pretreated and untreated plies in some examples.

Step 18 is an optional heating/sintering step that can be carried out on the preform to promote volumetric consolidation of the aerogel phase such that BN aerogel layer 26 tightens/contracts to form a slightly denser BN phase that preferentially adheres to fiber 24 surfaces. A suitable consolidation temperature can range from 1200° C. to 1500° C. in an exemplary embodiment. The temperature can be selected, along with heating duration, to sufficiently consolidate BN aerogel layer 26 while minimizing fiber-to-fiber sintering. Step 18 can be considered distinct from other heating processes that might be carried out, for example, to decompose the polymer resin within the preform.

At step 20, the preform can undergo CVI to form BN IFC layer 28 (FIG. 3). Layer 28 includes BN from both the aerogel pretreatment (i.e., layer 26) and additional BN deposited during CVI. In some cases, the CVI cycle time can be reduced because there is already an amount of BN on fibers 24 from pretreatment. The BN nanostructures (i.e., nanotubes and nanosheets) of BN aerogel layer 26 can also act as a template for epitaxial growth of additional h-BN deposited via CVI. The h-BN includes basal planes of covalently bonded B and N atoms aligned with the fiber axis. In an operational environment, such nanostructure facilitates matrix sliding, relative to fiber 24, within BN IFC layer 28, and debonding of IFC layer 28 to protect fiber 24. Step 20 can additionally and/or alternatively include the formation of other oxidation resistant coatings via CVI, such as silicon-doped BN (Si—BN), SiC, and carbon, to name a few non-limiting examples.

At step 22, a ceramic (e.g., SiC) matrix can be deposited on BN IFC layer 28 and fiber 24, The matrix can be deposited using CVI, which can be carried out until the resulting CMC has reached the desired residual porosity. Other techniques for matrix formation are contemplated herein, such as one or a combination of slurry infiltration, melt infiltration, and polymer infiltration and pyrolysis. Such techniques can supplement the CVI process. Protective coatings for the CMC (e.g., thermal barrier coatings, environmental barrier coatings, etc.) can optionally be applied after step 22.

Figure 4:
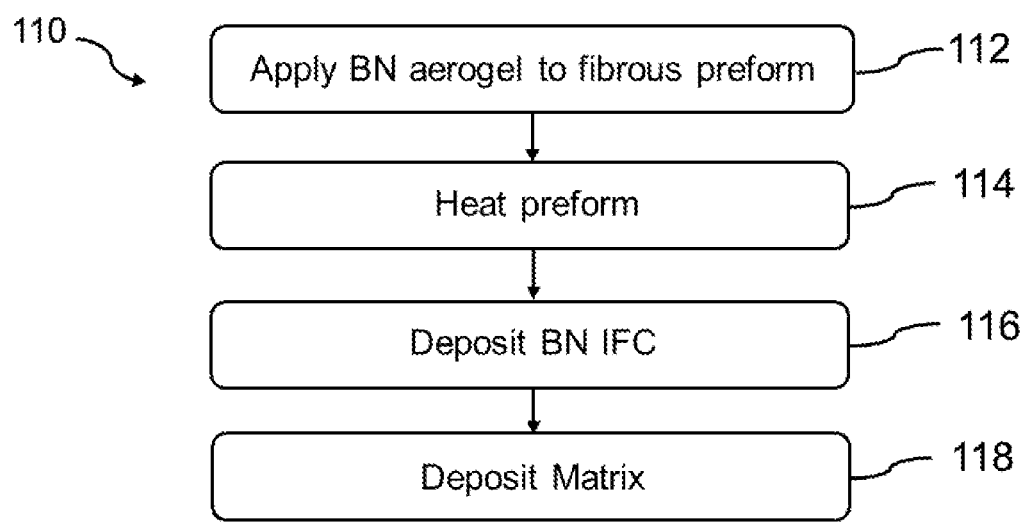
FIG. 4 is a flowchart illustrating a method of forming a CMC from a pretreated fibrous preform.

FIG. 4 is a method flowchart illustrating select steps of first alternative method 110 for pretreating a fibrous preform with a BN aerogel to form a CMC. The preform can be formed from sheets, plies, etc., of ceramic fibers (e.g., fibers 24).

At step 112, the fiber preform can be immersed in a water bath of ultrasonicated milled h-BN to form a slurry-coated preform. The preform can be mounted within perforated tooling or basket during immersion. The preform can subsequently be freeze-dried to complete a BN aerogel layer (e.g., layer 26) to form a pretreated preform. The size of the water bath can be scaled such that multiple (e.g., up to one dozen) preforms can be immersed at once. Step 112 is followed by step 114, which is an optional heat treatment on the preform to consolidate the BN aerogel that is substantially similar to step 18 above. Step 114 is followed by step 116 which is the CVI deposition of a BN IFC layer (e.g., layer 28) substantially similar to step 20 above. A ceramic matrix can be deposited in step 118, which is substantially similar to step 22 above.

Figure 5:
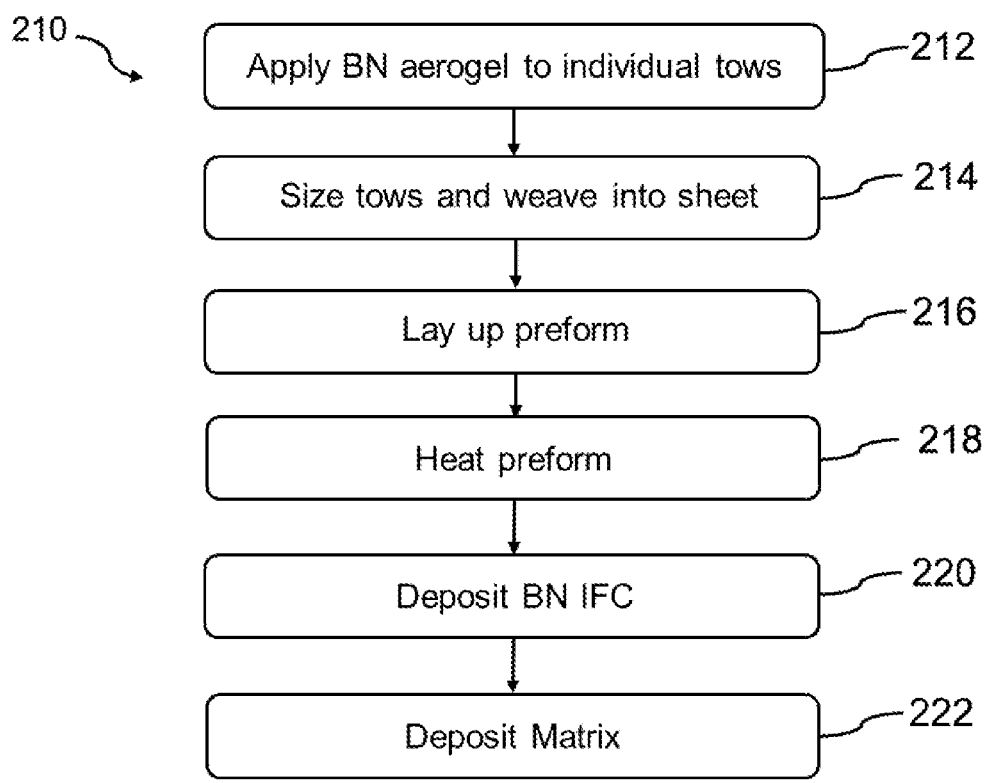
FIG. 5 is a flowchart illustrating a method of forming a CMC from pretreated fiber tows.

FIG. 5 is a method flowchart illustrating select steps of second alternative method 210 for pretreating individual tows (e.g., bundles of fibers 24) with a BN aerogel to form a CMC.

At step 212, individual tows can be pulled through a water bath of ultrasonicated milled h-BN to form a slurry-coated fiber. Tows can be pulled through one at a time, or multiple individual tows can be pulled through together, in either case, being coated individually. The tows can be pulled under tension by rollers similar to step 12, and subsequently be freeze-dried to complete a BN aerogel layer (e.g., layer 26) to form a pretreated tow. Pretreated tows can be sized and woven into a sheet with other pretreated or untreated tows in step 214. The sheet can be made into a pre-preg, similar to step 14, or directly cut into plies. Subsequent steps 216, 218, 220, and 222 can be analogous to the preforming, heating, IFC deposition, and matrix deposition steps of steps 16, 18, 20, and 22, respectively.

A CMC component formed with the disclosed pretreated fibrous materials can be incorporated into aerospace, maritime, or industrial equipment, to name a few, non-limiting examples.

Discussion of Possible Embodiments

The following are non-exclusive descriptions of possible embodiments of the present invention.

A method of forming a ceramic matrix composite (CMC) comprises applying a boron nitride (BN) aerogel to a fibrous material to form a pretreated fibrous material, depositing, using chemical vapor infiltration (CVI), a BN interface coating (IFC) on the pretreated fibrous material, and depositing a matrix on the BN IFC and the pretreated fibrous material.

The method of the preceding paragraph can optionally include, additionally and/or alternatively, any one or more of the following features, configurations and/or additional components:

In the above method, the step of applying the BN aerogel can include immersing the fibrous material in a bath of water and hexagonal BN (h-BN) to form a slurry-coated fibrous material, and freeze-drying the slurry coated fibrous material.

In any of the above methods, the fibrous material can include a sheet of ceramic fibers.

In any of the above methods, the step of immersing the fibrous material can include pulling the sheet through the bath of water and h-BN under tension.

Any of the above methods can further include forming a pre-preg sheet by injecting the sheet with a polymer resin and curing the sheet.

In any of the above methods, the polymer resin can include one of polyvinyl alcohol and polyvinyl butyral.

Any of the above methods can further include forming plies from the pre-preg sheet, and laying up the plies into a preform.

Any of the above methods can further include prior to depositing the BN IFC, consolidating the BN aerogel by heating the preform to a temperature ranging from 1200° C. to 1500° C.

In any of the above methods, the fibrous ceramic material can include a preform.

Any of the above methods can further include prior to depositing the BN IFC, consolidating the BN aerogel by heating the preform to a temperature ranging from 1200° C. to 1500° C.

In any of the above methods, the fibrous material can include an individual tow.

In any of the above methods, the step of immersing the fibrous material can include pulling the tow through the bath of water and h-BN under tension.

Any of the above methods can further include sizing the tow, and weaving the tow into a sheet.

Any of the above methods can further include forming plies from the sheet, and laying up the plies into a preform.

Any of the above methods can further include prior to depositing the BN IFC, consolidating the BN aerogel by heating the preform to a temperature ranging from 1200° C. to 1500° C.

In any of the above methods, the BN aerogel can include BN nanotubes and BN nanosheets.

In any of the above methods, the BN IFC can include h-BN.

In any of the above methods, the step of depositing the matrix can include at least one of chemical vapor infiltration, slurry infiltration, melt infiltration, and polymer infiltration and pyrolysis.

In any of the above methods, the matrix can include silicon carbide (SiC).

Any of the above methods can further include prior to the step of depositing the matrix, depositing, using CVI, an oxidation resistant coating on the pretreated fibrous material, the oxidation resistant coating including at least one of silicon-doped BN, SiC, and carbon.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a ceramic matrix composite (CMC), the method comprising:
    applying a boron nitride (BN) aerogel to a fibrous material to form a pretreated fibrous material;
    depositing, using chemical vapor infiltration (CVI), a BN interface coating (IFC) on the pretreated fibrous material; and
    depositing a matrix on the BN IFC and the pretreated fibrous material.

2. The method of claim 1, wherein the step of applying the BN aerogel comprises:
    immersing the fibrous material in a bath of water and hexagonal BN (h-BN) to form a slurry-coated fibrous material; and
    freeze-drying the slurry coated fibrous material.

3. The method of claim 2, wherein the fibrous material comprises a sheet of ceramic fibers.

4. The method of claim 3, wherein the step of immersing the fibrous material comprises:
    pulling the sheet through the bath of water and h-BN under tension.

5. The method of claim 3 and further comprising:
    forming a pre-preg sheet by injecting the sheet with a polymer resin and curing the sheet.

6. The method of claim 5, wherein the polymer resin comprises one of polyvinyl alcohol and polyvinyl butyral.

7. The method of claim 5 and further comprising:
    forming plies from the pre-preg sheet; and
    laying up the plies into a preform.

8. The method of claim 7 and further comprising:
    prior to depositing the BN IFC, consolidating the BN aerogel by heating the preform to a temperature ranging from 1200° C. to 1500° C.

9. The method of claim 2, wherein the fibrous ceramic material comprises a preform.

10. The method of claim 9 and further comprising:
    prior to depositing the BN IFC, consolidating the BN aerogel by heating the preform to a temperature ranging from 1200° C. to 1500° C.

11. The method of claim 2, wherein the fibrous material comprises an individual tow.

12. The method of claim 11, wherein the step of immersing the fibrous material comprises:
    pulling the tow through the bath of water and h-BN under tension.

13. The method of claim 12 and further comprising:
    sizing the tow; and
    weaving the tow into a sheet.

14. The method of claim 13 and further comprising:
    forming plies from the sheet; and
    laying up the plies into a preform.

15. The method of claim 14 and further comprising:
    prior to depositing the BN IFC, consolidating the BN aerogel by heating the preform to a temperature ranging from 1200° C. to 1500° C.

16. The method of claim 2, wherein the BN aerogel comprises BN nanotubes and BN nanosheets.

17. The method of claim 2, wherein the BN IFC comprises h-BN.

18. The method of claim 2, wherein the step of depositing the matrix comprises at least one of chemical vapor infiltration, slurry infiltration, melt infiltration, and polymer infiltration and pyrolysis.

19. The method of claim 2, wherein the matrix comprises silicon carbide (SiC).

20. The method of claim 2 and further comprising:
    prior to the step of depositing the matrix, depositing, using CVI, an oxidation resistant coating on the pretreated fibrous material, the oxidation resistant coating comprising at least one of silicon-doped BN, SiC, and carbon.

* * * * *